United States Patent Office 3,274,006
Patented Sept. 20, 1966

3,274,006
BOROSILICATE GLASS MELTING METHOD
Charles L. McKinnis, Granville, Ohio, assignor to Owens-Corning Fiberglas Corporation, a corporation of Delaware
No Drawing. Filed June 29, 1960, Ser. No. 39,452
20 Claims. (Cl. 106—50)

This is a continuation-in-part of copending application Serial No. 828,932, filed July 23, 1959, and now abandoned.

This invention relates to continuous or semicontinuous processes for producing borosilicate glass, whereby the stable, viscous foam which is usually formed during the glass melting stage of such processes is substantially eliminated by improved batching techniques. More particularly, the invention relates to a continuous method for producing borosilicate glass fibers, whereby the yield of borosilicate glass from a given melting tank is significantly increased resulting in corresponding increase of yield of fibers therefrom, without in any way adversely effecting the quality of the glass or fibers, either by charging, as the sole batch source of the boric oxide present in the glass melt, at least one of certain alkaline earth metal borates, or by charging a conventional source for $B_2O_3$, such as boric acid or borax, and including in the charge as the source material for at least substantially one-half of the alkaline earth metal oxide content of the melt, at least one alkaline earth metal compound other than a borate, and specifically an aluminate or a silicate.

Borosilicate glasses have been employed extensively in recent years in such applications as glass fibers, reflectors, ophthalmic lenses, and heat resisting ware, just to mention a few. However, the production of such glasses, and particularly the production of glass fibers from melts of such borosilicate glasses, is severely hampered by the presence of a stable foam, or viscous, glass-bubble phase, which originates during the early stages of the glass melting process and floats on the surface of the molten bath. For example, such foam has been found to act as a thermal insulating blanket which results in a lower transfer of heat to the molten bath. Further, such foam captures the more refractory components of the batch and retards their solution, resulting in a condition known in the art as scum. Finally, such foam generally limits the furnace operating temperatures because of the tendency toward increased foam formation with higher temperatures. Because of the presence of the stable foam and the various undesirable conditions imposed by such foam as mentioned above, the yield and permissible pull rate[1] of a particular borosilicate glass from any given melting tank falls considerably short of the theoretical values for such tank and composition, and, for example, the yield is substantially lower than the yield of soda-lime-silica glass melted in the same tank and under essentially the same conditions.

Experiments have shown that this stable foam is primarily the result of the formation of a surface layer of glass, differing in composition from the bulk of the molten bath, and having a high viscosity. This viscous surface glass inhibits the rupture of bubbles formed by the evolution of gaseous products of decomposition or combustion, such as $SO_2$, $CO_2$ and $H_2O$, from parts of the raw materials of the batch.

This stable foam, which is present generally over the entire surface of the melt, is different from the foam that occurs during the initial stages of melting of such a glass batch formulation as soda-lime-silica. The foaming period of such a batch is relatively short-lived, with most commercial melters being operated with a batch and foam line approximately two-thirds of the way down the melter.

A stable foam appears to occur only in continuous or semi-continuous melting processes in which borosilicate glass batch formulations are utilized. More particularly, it has been found that this stable foam seems to occur only in borosilicate glass melts wherein the boric oxide content is approximately 2 percent or greater, and is present in conjunction with alkaline earth oxides, e.g., lime, magnesia, barium oxide, or, if used, possibly strontium oxide, in a combined content of about 4 percent or greater. For example, stable foams are formed when glass compositions identified in U.S. Patents 2,571,074, 2,882,173 and 2,877,124 are melted by continuous methods.

The terms "percent" and "parts" are used herein, and in the appended claims, to refer to percent and parts by weight, unless otherwise indicated.

It has now been discovered that the stable foam formed during continuous melting of borosilicate glass batches can be substantially reduced in quantity, that the time required for its dissipation can be materially shortened, and that the charging rate of the batch constituents and the rate of withdrawal of borosilicate glass for any given melting tank can be substantially increased, by utilizing either alkaline earth metal borates, in which alkaline earth metal oxides are combined chemically with boric oxide in certain essential stoichiometric ratios, as essentially the only source for boric oxide in the batch, or, alternately, by utilizing an alkaline earth metal compound other than a borate, usually an aluminate or a silicate, as the source for at least substantially one-half of the alkaline earth oxide content of the melt.

It is, therefore, an object of the invention to provide an improved, expedient, continuous method for melting a borosilicate glass batch composition.

Another object of the invention is to provide a borosilicate glass batch formulation which, during melting, exhibits minimum tendencies toward the formation of a stable surface foam.

A still further object of the invention is the provision of an improved continuous method for melting a borosilicate glass batch composition which enables a substantial increase in yield of borosilicate glass for any given melting tank.

More particularly, it is a further object of the invention to provide an improved method for the continuous manufacture of glass fibers from a borosilicate glass batch composition containing at least one alkaline earth metal oxide and at least 2 percent of boric oxide, the combined content of alkaline earth metal oxide and boric oxide comprising at least 4 percent of the glass composition, balance silica and other glass-forming ingredients, by charging, as essentially the only source for boric oxide in the glass batch formulation, one of several particular alkaline earth metal borates or mixtures of particular alkaline earth metal borates.

It is a still further object of the invention to provide an improved method for the continuous manufacture of glass fibers from a borosilicate glass batch composition containing at least one alkaline earth metal oxide and at least 2 percent of boric oxide, the combined content of alkaline earth metal oxide and boric oxide comprising at least 4 percent of the glass composition, balance silica and other glass-forming ingredients, by charging, as the source for at least substantially one-half of the alkaline earth metal oxide present in the glass melt, at least one alkaline earth metal silicate or aluminate.

Other objects and advantages of the invention will in part be obvious, and will in part appear hereinafter.

---
[1] Pull rate is defined as the number of square feet of the surface area of the melting tank required to melt a ton of glass in one 24 hour day. It is computed in terms of square feet per ton per day.

For a better understanding of the nature and objects of the invention, reference should be made to the following detailed description.

In conventional continuous processes for producing borosilicate glass fibers, a batch composition is charged into one end of a glass melting tank wherein the batch constituents are heated to effect vitrification thereof. The vitreous material is then caused to flow into a forehearth at the other end of the tank from which streams of the molten glass are withdrawn through a suitable bushing. The streams are thereafter attenuated and solidified substantially instantaneously to form the desired size fibers. It previously has been the practice to introduce $B_2O_3$ into the glass melt as borax, dehydrated borax, dehydrated rasorite, boric acid, or simply as the compound itself. In such conventional practice, a very stable foam forms and remains for a relatively long period of time, as previously noted. Due to the formation of such stable foam, a longer melting time or stay period in the melting tank is necessitated than would be the case if such foam were not formed. As a consequence, the permissible charging rate of the batch constituents and the yield of the melted glass from the tank are reduced. In this respect, if it is attempted to pull or withdraw the glass from the tank before substantially all the foam has been dissipated, a serious problem is encountered. For example, in glass fiber manufacture, this foam passes along with the glass melt from the melting furnace, into the forehearth, and from there into the bushing and fiber forming apparatus, where it causes stoppages in the forming operation.

As previously stated, it has been found that, by utilizing, as the sole source of boric oxide, raw materials in which alkaline earth metal oxides are combined chemically with boric oxide in certain essential stoichiometric ratios, the stable foam formed during continuous melting of borosilicate glass batch formulations can be substantially reduced in quantity; the time required for its dissipation can be materially shortened; and the charging rate of the batch constituents and the corresponding yield of the melted glass can be significantly increased. For example, when a mineral such as colemanite or ulexite is the sole source for boric oxide in a borosilicate glass batch, the foam formed during continuous melting is dissipated after a greatly reduced time and the glass yield for any particular furnace is significantly increased.

More particularly, it has been found that when the boric oxide batch constituent is a calcium borate containing less than approximately 76[2] percent of boric oxide, a magnesium borate containing less than approximately 62[2] percent of boric oxide, or a barium borate containing less than approximately 70[2] percent of boric oxide, the foam resulting from the continuous melting of such borosilicate glass batch formulations is substantially reduced in quantity, the time required for dissipation thereof is materially shortened, and, as a result, the batch charging rate and simultaneously the yield of the glass can be significantly increased without in any way adversely affecting the quality of the glass.

An examination of the phase equilibrium diagrams of the binary systems of calcium oxide-boric oxide, magnesium oxide-boric oxide, barium oxide-boric oxide and most probably strontium oxide-boric oxide reveals an explanation of the above phenomena. All these systems are characterized by a region of immiscibility. For example, this region of immiscibility begins at about 100 mol percent boric oxide and extends to the boric oxide to metal oxide molar ratio of approximately 2.55:1 in the calcium oxide-boric oxide system, 0.946:1 in the magnesium oxide-boric oxide system, and 5.13:1 in the barium oxide-boric oxide system. These immiscible regions consist of an essentially pure boric oxide phase and the particular alkaline earth borate.

The boric oxide rich phase has a very low density,

---
[2] Based upon the weight of $B_2O_3$ and of the alkaline earth oxide.

namely 1.496 grams per cubic centimeter, and low surface tension, namely 88 dynes per centimeter, both of these properties being measured at 1100° C. These properties are to be compared with those of ordinary glasses, such as, soda-lime-silica glass compositions, having densities of approximately 2.200 grams per cubic centimeter at 100° C., and surface tensions of approximately 300 dynes per centimeter at 1100° C.

During the initial stages of melting processes employing conventional borosilicate glass batches, i.e., batches containing dehydrated borax, dehydrated rasorite, or boric acid as the boric oxide batch constituent, it is quite probable that a segregation of boric oxide occurs. The probability is particularly great because these species have approximately the lowest reaction temperature of all the batch components, specifically, 450° C. for boric acid and 815° C. for borax. When such a segregation of boric oxide occurs, it is also probable that the boric oxide interacts with any alkaline earth oxide present to form an immiscible phase consisting of an essentially pure alkaline earth borate in addition to the boric oxide phase. The surface of the melt, therefore, being enriched in boric oxide, has most probably a lower density, a lower surface tension and a lower viscosity than the bulk of the melt. Such a state of conditions is only transient, however, due to the high volatility of the boric oxide. As this component volatilizes, the surface of the melt becomes more dense, and the surface tension and viscosity should increase correspondingly.

Because the surface of a conventional borosilicate melt is higher with respect to surface tension and viscosity than the bulk of the melt, the dissipation of the bubbles (formed in the early stages of the melting process because of the decomposition of the batch components) is inhibited. Further, the buoyancy of the entrapped bubbles inhibits the assimilation of this surface glass into the melt.

It is believed that all of the above-discussed factors contribute to the formation of the stable surface foam during the continuous melting of a conventional borosilicate glass and, accordingly, to a glass yield for any given melting tank or furnace which is lower than would otherwise be possible if such foam were greatly reduced in quantity or more rapidly dissipated. The fact that stable foam has been observed only in a continuous melting process, and has not been synthesized in a static crucible test, is probably attributable, at least in part, to the vapor pressure of boric oxide in the atmosphere above the melt. In a continuous, dynamic process, the volatiles are continuously swept away, along with the products of combustion of the heating fuel, so that the vapor pressure of boric oxide in the atmosphere above the melt is low. The low boric oxide vapor pressure favors the volatilization of boric oxide from the melt, in a continuous operation. In the static crucible test, however, it is probable that the vapor pressure of boric oxide is substantially higher, so that its volatilization from the melt is prevented or at least slowed. In addition, boric oxide is being continuously charged to a continuous melting furnace, which is not the case in a crucible test.

As has been indicated previously, the use of colemanite or ulexite in a borosilicate batch formulation, as essentially the only source for boric oxide, greatly reduces the time required for foam dissipation and correspondingly increases the yield of glass from any given furnace. Colemanite is a calcium borate of the general formula, $Ca_2B_6O_{11}\cdot 5H_2O$, and consists of approximately 27.28 percent CaO, 50.81 percent $B_2O_3$ and 21.91 percent $H_2O$, with minute quantities of MgO, $SiO_2$, $Al_2O_3$ and $Fe_2O_3$ sometimes being present as impurities. Ulexite is also a calcium borate of the general formula, $$NaCaB_5O_9\cdot 8H_2O$$

and consists of approximately 13.85 percent CaO, 42.95 percent $B_2O_3$, 7.65 percent $Na_2O$ and 35.55 percent $H_2O$. As can be seen from the percent composition of these minerals, the calcium oxide is combined chemically with boric oxide in such a manner that the stoichiometric molar ratio of boric oxide to calcium oxide is beyond the previously discussed region of immiscibility (less than 2.55). Therefore, no $B_2O_3$-containing immiscible phase should form during melting of a batch in which either of the minerals or a mixture of the two constitutes essentially the only source for boric oxide.

It is believed that a further factor in preventing a stable foam formation during continuous melting of a borosilicate glass in accordance with the invention is the higher melting temperature of the alkaline earth borates in comparison with the melting temperatures of conventional boric oxide batch constituents. For example, the melting temperature of calcium borate is in the 1100° C. to 1200° C. range, while the melting temperature of borax is approximately 815° C. and of boric acid approximately 450° C. As the higher melting temperature of calcium borate is close to the temperature at which the other batch ingredients go into solution, the calcium borate interacts with the other batch ingredients, thus further minimizing the probability of the formation of the immiscible phase.

Besides colemanite and ulexite, various other minerals or raw materials may be used as the boric oxide batch constituent in accordance with the invention. For example, the following calcium borates, all containing less than 76 percent of boric oxide, may be employed.

Mineral:  Approximate composition (in weight percent)
Priceite _____ 32.11 CaO, 49.84 $B_2O_3$, 18.05 $H_2O$.
Probertite ___ 15.98 CaO, 49.56 $B_2O_3$, 8.83 $Na_2O$, 25.63 $H_2O$.
Meyer-
 hofferite ___ 25.08 CaO, 46.72 $B_2O_3$, 28.28 $H_2O$.
Inyoite _____ 20.20 CaO, 37.62 $B_2O_3$, 42.18 $H_2O$.

In addition to the calcium borates mentioned above, the following magnesium borate, which contains less than 62 percent of boric oxide, may be employed:

Mineral:  Approximate composition (in weight percent)
Kotoite _____ 63.46 MgO, 36.54 $B_2O_3$.

Combined borates, or borates, containing a plurality of alkaline earth metal oxides may also be employed as the boric oxide batch constituent in accordance with the invention. Boric oxide must constitute a lesser percentage of such borates, however, than the minimum which forms two immiscible phases with the alkaline earth metal oxide which forms two immiscible phases with the least amount of boric oxide. For example, calcium-magnesium borates containing less than 62 percent of boric oxide can be utilized in accordance with the invention.

Various calcium and magnesium borates which contain refractory oxides, iron oxides and the like can also be employed so long as the presence of such oxides in the final glass composition is not detrimental thereto. The following are examples of such minerals:

Mineral:  Approximate composition (in weight percent)
Howlite _____ 28.66 CaO, 15.34 $SiO_2$, 44.49 $B_2O^3$, 11.51 $H_2O$.
Bakerite ____ 35.97 CaO, 27.92 $B_2O_3$, 28.89 $SiO_2$, 7.22 $H_2O$.

It should be understood that the above-mentioned minerals are only examples of raw materials that can be employed as the source of boric oxide in accordance with the invention, and are not to be as an exhaustive listing thereof. It is only necessary that the alkaline earth metal oxide or oxides be chemically combined with boric oxide in the critical stoichiometric proportions previously set forth in order to gain the new and unexpected results produced by their utilization.

In producing borosilicate glass in accordance with the invention, the amount and composition of the boric oxide batch raw material selected must, of course, be such that the necessary amount of boric oxide desired in the final glass composition is supplied without also supplying an excess of an alkaline earth oxide, refractory oxide or the like. In general, borosilicate glasses contain at least 40 percent of silica and from about 1 percent to about 15 percent of boric oxide, the balance being various other glass-forming ingredients. More particularly, the composition of the borosilicate glass fibers produced in accordance with the invention generally consist of from about 50 percent to about 75 percent of silica, from about 2 percent to about 15 percent of boric oxide, from about 2 percent to about 25 percent of alkaline earth metal oxides, i.e., CaO, MgO, BaO and SrO, with the amount of CaO normally being at least 50 percent of the alkaline earth metal oxide content, from about 0 percent to about 15 percent of alkali metal oxides, particularly $Na_2O$, $K_2O$ or both, from about 2 percent to about 20 percent of alumina, from 0 percent to as much as about 10 percent of titania, as much as about 1 percent of iron oxide, and from about 0 percent to about 3 percent of $F_2$. Traces of other glass-forming ingredients or impurities such as MnO, $ZrO_2$ and ZnO may be present.

In producing such borosilicate glasses, a batch formulation, calculated to yield the desired final borosilicate glass composition, is prepared and continuously charged into one end of a suitable glass melting tank. The batch constituents are heated to a temperature sufficient to effect vitrification thereof (such temperatures generally being in the range of from about 1093° C. to about 1600° C.), and the resulting vitreous charge is then withdrawn from the glass melting tank at a point remote from the charging end thereof. After removal from the melting tank, the vitreous charge is formed into a desired shape and then cooled sufficiently rapidly to prevent devitrification. Apart from the identity of the $B_2O_3$-containing constituent of the batch, the melting operation is conventional.

*Example 1*

A glass batch formulation for use in accordance with the present invention was prepared in the following proportions, based upon a total weight of 9080 grams:

4594.5 grams of silica
890.0 grams of calcium carbonate
1733.5 grams of sodium carbonate
1859.0 grams of colemanite
3.0 grams of iron oxide ($Fe_2O_3$)

The above batch formulation was found to provide a borosilicate glass consisting of 62.4 percent of $SiO_2$, 13.5 percent of $Na_2O$, 13.8 percent of CaO, 10.1 percent of $B_2O_3$ and 0.2 percent of $Fe_2O_3$.

A glass melting furnace comprising a melting tank having a surface area of approximately 0.5 square foot was filled to a depth of about 1¾" with molten glass resulting from fusion of the above-identified batch. Thereafter, molten glass was removed from one end of the furnace at a rate of 10 square feet per ton per day, while the batch was continuously fed into the other end of the furnace by means of a screw conveyor at a rate sufficient to maintain a constant depth of approximately 1¾" of molten glass. The surface temperature of the glass was maintained at approximately 2350° F. throughout the run. The run was continued for twenty minutes, at which time the feeding and draining was discontinued.

The time for foam dissipation was measured after completion of the twenty minute run by observing the reflectivity of the surface of the molten glass. The observations were made through a hole in the drainage end of the furnace in such a manner that a clear image of the screw conveyor was obtained when little or no form was present, but no such image was obtained so long as there was a thick stable foam on the glass surface. The time for foam dissipation was taken as that time required to obtain a clear image of the screw conveyor, time being measured from the cessation of feeding of batch and draining of molten glass.

In the present example, using colemanite as the sole boric oxide batch constituent, a clear image of the screw conveyor was obtained ten minutes after feeding and draining were discontinued.

For purposes of comparison, but not in accordance with the invention, a batch formulation employing dehydrated borax as the boric oxide batch constituent was prepared in the required proportions to produce the same finished glass composition as recited in Example 1. The batch formulation, based upon 9080 grams, consisted of the following ingredients in the indicated quantities:

4791.5 grams of silica
1937.2 grams of calcium carbonate
1194.6 grams of sodium carbonate
1142.8 grams of dehydrated borax
13.9 grams of iron oxide ($Fe_2O_3$)

The procedure used in Example 1 was then repeated, except that the above batch formulation was substituted for that employed in Example 1. After feeding and draining was discontinued, the time for foam dissipation was measured. In this instance, a clear image of the screw conveyor was not obtained for thirty minutes.

It has been found that the employment of alkaline earth metal borates in accordance with the invention as the boric oxide batch constituent provides another very significant advantage over the use of conventional boric oxide batch materials, if the fact that the use of such enables a greater yield of vitreous material from any given melting tank, as previously discussed, is not taken advantage of: in other words, if the charging and pull rates remain the same as when using conventional batch compositions. Specifically, a glass having improved properties can be obtained where an alkaline earth metal borate is employed as the source material for all of the boric oxide in the glass melt and the throughput, or rate of charging of batch and the rate of withdrawal of vitreous material, is not increased. The improvement results from a more complete melting of the batch constituents as a consequence of the elimination of the formation of a stable foam. For example, as is previously mentioned, such stable foam has been found to act as a thermal insulating blanket which results in a lower transfer of heat to the molten bath. Further, the foam appears to capture the more refractory components of the batch and to retard their solution, resulting in the condition known in the art as scum, which must subsequently be eliminated from the melt, at least to a substantial extent. It is probable that a complete fusion and inter-reaction of all of the batch constituents, and particularly the minute silica nuclei, which are very slow to fuse and dissolve, does not take place, but that the more nearly complete the elimination of the scum, the more nearly complete is the fusion and inter-reaction. It is believed that the presence of such unfused silica nuclei in the melt tends to weaken the glass bodies produced therefrom. Since the instant method decreases the scum, it can be used to improve the melting history of fibers for a given yield, as well as to increase the yield.

The instant invention also contemplates substantial elimination or more rapid dissipation of foam in a borosilicate glass melt, and a corresponding significant increase in yield or throughput of vitreous material for any given glass melting tank, by employing as the batch source material for at least substantially one-half of the alkaline earth metal oxide in the vitreous material or melt alkaline earth metal compounds other than borates.

As has been discussed above in detail, a stable foam is produced during melting of a borosilicate glass batch by conventional procedures which in turn substantially lowers the yield of vitreous material from the glass melting tank. The instant invention has thus far been discussed in connection with the reduction of such a stable foam and a corresponding increase in yield by charging, as substantially the only source for $B_2O_3$, an alkaline earth borate. It has been found that it is also possible, and in most cases preferable, to accomplish substantial elimination of such stable foam by charging a conventional source for $B_2O_3$, such as boric acid or borax, and charging, as the source material for at least substantially one-half of the alkaline earth metal oxide in the melt, at least one alkaline earth metal compound other than a borate, usually an aluminate or a silicate. In this respect, optimum results, i.e., an increase in throughput or yield of about 15 percent, have been obtained where such silicates or aluminates comprise substantially the only source for the alkaline earth metal oxides; however, significant improvement in yield, i.e. about 5 percent, is obtained when charging only substantially half of the required alkaline earth metal oxide content as a silicate or aluminate. As a specific example, calcium oxide can be added as wollastonite ($CaSiO_3$), or magnesium can be added as talc

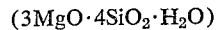

or a combination of calcium and magnesium oxides can be added with alumina and silica as a gehlenite

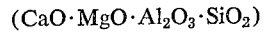

or as a diopside ($CaO \cdot MgO \cdot 2SiO_2$). Similar silicates or aluminates of barium or strontium can also be used to add these oxides when they are desired in a borosilicate glass.

In terms of the previously discussed theory of the formation of stable foam, it is believed that the alkaline earth metal oxides, present as silicates or aluminates, are chemically combined in such a manner as essentially to preclude their reaction with boric oxide until very late in the glass melting process. For example, the melting tempreature of wollastonite is in the 1430° C. to 1540° C. range, and the melting temperature of diopside is in the 1360° C. to 1390° C. range. As the higher melting temperature of the alkaline metal earth silicates and aluminates is close to or above the temperatures at which the other batch ingredients go into solution, the boric oxide apparently interacts with the other batch ingredients and does not react with the alkaline earth or earths until very late in the glass melting process, thus minimizing the probability of the formation of the immiscible phase. For example, substantially no stable foam was observed during the procedure described in the following example, which example constitutes the best presently known mode for practicing the instant invention.

*Example 2*

A glass batch formulation was prepared in proportions theoretically calculated to yield a borosilicate glass consisting of 52.95 percent $SiO_2$, 13.82 percent $Al_2O_3$, 21.22 percent CaO, 0.04 percent MgO, 9.09 percent $B_2O_3$, 1.38 percent $F_2$, 0.54 percent $Na_2O + K_2O$, 0.62 percent $TiO_2$, 0.28 percent $Fe_2O_3$ and 0.08 percent MnO.

The glass batch consisted of the following ingredients in the indicated proportions, based upon a total weight of 4336 grams:

648 grams of flint
1332 grams of Albion clay
1559 grams of wollastonite
625 grams of boric acid
123 grams of fluorspar
49 grams of salt cake The above batch was found to provide an actual finished borosilicate glass consisting approximately of 54.65 percent $SiO_2$, 14.45 percent $Al_2O_3$, 0.16 percent $Fe_2O_3$, 0.39 percent $TiO_2$, 22.10 percent CaO, 0.27 percent MgO, 0.28 percent $Na_2O$, 0.08 percent $K_2O$, 7.60 percent $B_2O_3$ and 0.33 percent $F_2$.

A glass melting tank located in a continuous glass fiber manufacturing production line was filled with molten glass resulting from fusion of batch in the above-identified proportions. Thereafter, vitreous material was withdrawn from one end of the tank at progressively increasing rates while the batch was continuously fed into the other end of the tank at a rate sufficient to maintain a constant depth of molten glass, the only limitation on the rate of withdrawal being the satisfactory melting or vitrification of the glass batch to a sufficient extent to enable its being formed into fibers by the fiber forming apparatus i.e., the fiber forming apparatus itself was not a limiting factor in the throughput of the glass, it being capable of still higher speeds. The progressive increase in the rate of charging and in the rate of withdrawal was continued until the optimum rates were established i.e., until satisfactory fibers could no longer be obtained by a further increase in throughput, and these rates recorded.

In a similar manner, for purposes of comparison, but not in accordance with the invention, a borosilicate glass batch formulation was prepared employing conventional source or batch materials. The batch formulation, based upon 4349 grams, consisted of the following ingredients in the indicated quantities:

1238 grams of flint
1187 grams of Albion clay
1187 grams of limestone
592 grams of boric acid
109 grams of fluospar
36 grams of salt cake This batch, prepared in the above proportions, was theoretically calculated to yield a borosilicate glass consisting of 52.69 percent $SiO_2$, 13.73 percent $Al_2O_3$, 21.02 percent CaO, 0.17 percent MgO, 9.75 percent $B_2O_3$, 1.37 percent $F_2$, 0.53 percent $Na_2O+K_2O$, 0.52 percent $TiO_2$ and 0.20 percent $Fe_2O_3$. The batch provided an actual final or finished borosilicate glass having the same composition as that obtained with the wollastonite containing batch recited above.

The same procedure as when using the wollastonite containing batch was repeated, employing the same melting tank and fiber forming apparatus, but substituting the conventional batch for the wollastonite containing batch. In this respect, the melting temperature and the depth of molten glass in the melting tank were maintained the same as when employing the wollastonite batch. The rates of charging and withdrawal were progressively increased, again the only limitation thereon being the time or stay period of the batch in the tank necessary to accomplish satisfactory melting thereof. In this run, it was found that a very thick, stable foam was formed on the surface of the melt, resulting finally, as the charging rate and rate of withdrawal were increased, in clogging and rendering inoperative the fiber forming bushing.

It was ascertained that the employment of the batch formulation in accordance with the invention enabled approximately a 10 percent increase in throughput or yield over that possible to obtain when employing the conventional batch formulation.

*Example 3*

A glass batch formulation was prepared in proportions theoretically calculated to yield a borosilicate glass consisting of 53.70 percent $SiO_2$, 14.51 percent $Al_2O_3$, 17.16 percent CaO, 3.45 percent MgO, 6.12 percent $B_2O_3$, 1.20 percent $F_2$, 2.98 percent $Na_2O$, 0.59 percent $TiO_2$, 0.25 percent $Fe_2O_3$, and 0.04 percent MnO.

The glass batch consisted of the following ingredients in the indicated proportions, based upon a total weight of 4273 grams:

1,057 grams of flint
1,465 grams of Albion clay
874 grams of wollastonite
348 grams of dolomite
42 grams of boric acid
326 grams of dehydrated borax
49 grams of salt cake
112 grams of fluorspar The above batch was found to provide an actual finished borosilicate glass consisting approximately of 54.86 percent $SiO_2$, 14.67 percent $Al_2O_3$, 0.18 percent $Fe_2O_3$, 0.44 percent $TiO_2$, 17.57 percent CaO, 3.79 percent MgO, 2.56 percent $Na_2O$, 0.12 percent $K_2O$, 5.40 percent $B_2O_3$ and 0.24 percent $F_2$.

A glass melting tank located in the continuous glass fiber manufacturing production line was filled with molten glass resulting from fusion of batch in the above identified proportions. Thereafter, vitreous material was withdrawn from one end of the tank at progressively increasing rates, again as in Example 2, the only limitation on the rate of withdrawal being the satisfactory melting or vitrification of the glass batch to a sufficient extent to enable its being formed into fibers by the fiber-forming apparatus, while the batch was continuously fed into the other end of the tank at a rate sufficient to maintain a constant depth of molten glass. The progressive increase in the rate of charging and the rate of withdrawal was continued until the optimum rates were established.

In a similar manner, for purposes of comparison, but not in accordance with the invention, a borosilicate glass batch formulation was prepared employing conventional source or batch materials in the required proportions for obtaining the same final or finished borosilicate glass composition as recited above. The batch formulation, based upon 4349 grams, consisted of the following ingredients in the indicated quantities:

1380 grams of flint
1374 grams of Albion clay
719 grams of limestone
315 grams of burnt dolomite
118 grams of boric acid
292 grams of dehydrated borax
105 grams of fluorspar
46 grams of salt cake The same procedure as when using the above wollastonite containing batch was repeated, employing the same melting tank and fiber forming apparatus, but substituting the conventional batch for the wollastonite containing batch.

In this respect, the melting temperature and the depth of molten glass in the melting tank were maintained the same as when employing the wollastonite. The rates of charging and withdrawal were progressively increased until finally, the thick, stable foam which formed on the surface of the melt clogged and rendered inoperative the fiber forming bushing.

It was ascertained that the employment of the batch formulation in accordance with the invention enabled approximately a 5 percent increase in throughput over that possible to obtain when employing the conventional batch formulation.

It has been found that the use of either an alkaline earth metal borate as the sole source of boric oxide in the batch, or the use of an alkaline earth metal silicate or aluminate as the batch source for at least substantially one-half of the alkaline earth metal oxide content of the melt, enables the more efficient use of the boric oxide content of the charge in addition to the other advantages previously described. For example, a higher boric oxide content in the finished glass is obtained when an alkaline earth metal borate is charged as the boric oxide batch constituent instead of borax, boric acid or the like, even though the theoretical yields of boric oxide from both batch materials are identical. It should be noted that a similar phenomenon occurs when employing conventional boric oxide batch constituents and charging alkaline earth metal silicates and aluminates in accordance with the invention. This, of course, together with the advantages previously discussed, makes the use of batch formulations in accordance with the present invention more favorable from an economic standpoint and is, therefore, a highly important factor.

Calcium and magnesium oxides, chemically combined with silica and alumina have heretofore been used as constituents of a glass batch, usually, however, so far as is known, in the form of calumite, which is a blast furnace slag, and contains substantial amounts of sulfur. If a sufficient amount of calumite is added to a borosilicate glass batch to supply substantially all of the alkaline earth oxides required therein, an oxidizing agent, such as sodium sulfate is also added, and has been found to be disadvantageous. Specifically, sodium sulfate melts at a compartively low temperature (approximately 1600° F.), relative to the operating temperature required for the melting of a borosilicate glass, of from 2300–2900° F. The melting does not particularly involve the composition, but merely forms molten sodium sulfate, which is stable at temperatures up to about 2200° F., at which temperature sodium sulfate begins to decompose into essentially sodium oxide, $SO_2$ and $O_2$. In a borosilicate glass melt, the decomposition temperature of sodium sulfate is reached at about the time that the melt would otherwise be ready for use, and decomposition thereof, with the formation of the gaseous constituents foams the melt at a time in the melting operation when the foam cannot be tolerated. Limited amounts of sodium sulfate are desirable in a borosilicate melt because scavenging action toward the more refractory batch components facilitates the operation, but larger amounts thereof, such as are necessary when employing substantial quantities of calumite, are undesirable. It is ordinarily preferred that sodium sulfate be present to the extent of from about 0.05 percent to about 0.15 percent, but more than about 0.4 percent of sodium sulfate causes a serious foaming problem, and cannot be tolerated, particularly in a melting process in accordance with the invention where the elimination or minimization of foaming, and corresponding decreases in melting time, are desired. Accordingly, in a melting process according to the invention, sodium sulfate must constitute not more than about 0.4 percent of the melt, whether foaming is prevented by adding substantially all of the boric oxide as an alkaline earth borate or by adding substantially all of the alkaline earth constituents in a combined form, for example as aluminates or silicates.

It is to be understood that the present invention is not to be construed as based upon or dependent upon the various theories and hypotheses which have been expressed herein. Further, while the more advantageous embodiments of the invention have been described, it is obvious that modifications and variations can be made in the compositions and specific procedures discussed without departing from the spirit and scope of the present invention, as those skilled in the art will readily understand. Specifically, one or more borates, other than alkaline earth borates, of constituents suitable for a particular glass formulation can be used in place of all or a part of an alkaline earth borate, so long s such borates fuse to form a single liquid phase, and are used in proportions that no constituent is added in excess of the proportion desired. Such modifications and variations and others apparent to a skilled worker are considered to be within the purview and scope of the invention as defined by the appended claims.

I claim:
1. In a continuous method for producing borosilicate glass fibers containing at least one alkaline earth metal oxide and at least 2 percent of boric oxide, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding all of the boric oxide to the batch as an alkaline earth metal borate comprising an amount of boric oxide sufficiently low that such borate forms a single liqnid phase upon fusion, but sufficient boric oxide to supply the proportion thereof required without also supplying an excess of an alkaline earth metal oxide, and simultaneously increasing the rate of charging of the batch constituents and correspondingly increasing rate of withdrawal of the streams of the vitreous material from the tank to rates at which foam in the melting tank prevents withdrawal of the streams of the vitreous material therefrom when the boric oxide is charged in an uncombined form.

2. In a continuous method for producing borosilicate glass fibers containing at least one alkaline earth metal oxide and at least 2 percent of boric oxide, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from the streams, the improvement comprising the steps of adding at least one alkaline earth metal compound selected from the group consisting of borates, aluminates, and silicates to the batch, and where the compound, when a borate, is one comprising an amount of boric oxide sufficiently low that such borate forms a single liquid phase upon fusion, and constitutes substantially all of the boric oxide in the batch, and, when an aluminate and when a silicate constitutes at least substantially one-half of all of the alkaline earth metal oxide of the batch, and simultaneously increasing the rate of charging of the batch constituents and correspondingly increasing the rate of withdrawal of the vitreous material from the tank to rates at which foam within the melting tank prevents withdrawal of the streams of the vitreous material therefrom when both the boric oxide and the alkaline earth metal oxide are charged in an uncombined form.

3. In a continuous method for producing borosilicate glass fibers containing at least one alkaline earth metal oxide and at least 2 percent of boric oxide, the combined content of alkaline earth metal oxide and boric oxide comprising at least 4 percent of the glass composition, balance silica and other glass-forming ingredients, which method includes s.eps of charging batch constituents into a suitable melting tank, and heating the batch constituents to effect vitrification thereof, while withdrawing streams of the vitreous materials from the tank and forming fibers from such streams, the improvement comprising the steps of adding at least one alkaline earth metal compound selected from the group consisting of silicates and aluminates to the batch in an amount sufficient to supply at least substantially one-half of the alkaline earth metal oxide content of the vitreous material, and simultaneously increasing the rate of charging of the batch constituents and correspondingly increasing the rate of withdrawal of the vitreous material from the tank to rates at which foam within the melting tank prevents the withdrawal of the streams of the vitreous material therefrom when the alkaline earth metal oxide is charged in an uncombined form.

4. In a continuous method for producing borosilicate glass fibers containing at least one alkaline earth metal oxide and at least 2 percent of boric oxide, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding at least one alkaline earth metal silicate to the batch in an amount sufficient to supply at least substantially one-half of the alkaline earth metal oxide content of the vitreous material, and simultaneously increasing the rate of charging of the batch constituents and correspondingly increasing the rate of withdrawal of the vitreous material from the tank to rates at which foam within the melting tank prevents the withdrawal of the streams of the vitreous material therefrom when the alkaline earth metal oxide is charged in an uncombined form.

5. In a continuous method for producing borosilicate glass fibers containing at least one alkaline earth metal oxide and at least 2 percent of boric oxide, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding essentially all of the alkaline earth metal oxide to the batch as at least one alkaline earth metal compound selected from the group consisting of silicates and aluminates, and simultaneously increasing the rate of charging of the batch constituents and correspondingly increasing the rate of withdrawal of the vitreous material from the tank to rates at which foam within the melting tank prevents the withdrawal of the streams of the vitreous material therefrom when the alkaline earth metal oxide is charged in an uncombined form.

6. In a continuous method for producing borosilicate glass fibers consisting essentially of from about 50 percent to about 75 percent of silica, from about 2 percent to about 15 percent of boric oxide, from about 2 percent to about 25 percent of at least one alkaline earth metal oxide, from about 0 percent to about 15 percent of at least one alkali metal oxide, from about 2 percent to about 20 percent of alumina, from about 0 percent to about 10 percent of titania, as much as about 1 percent of iron oxide, and from about 0 percent to about 3 percent of fluorine, which method includes the steps of charging batch constituents into a suitable melting tank to formulate a composition within the indicated proportions, and heating the batch constituents to effect vitrification thereof, while withdrawing streams of the vitreous material from the tank and forming fibers from such streams, the improvement comprising the steps of adding at least one alkaline earth metal compound selected from the group containing silicates and aluminates to the batch in an amount sufficient to supply at least substantially one-half of the alkaline earth metal content of the vitreous material, and simultaneously increasing the rate of charging of the batch constituent and correspondingly increasing the rate of withdrawal of the vitreous material from the tank to rates at which foam within the melting tank prevents the withdrawal of the streams of the vitreous material therefrom when the alkaline earth metal oxide is charged in an uncombined form.

7. In a continuous method for producing borosilicate glass fibers consisting essentially of from about 50 percent to about 75 percent of silica, from about 2 percent to about 15 percent of boric oxide, from about 2 percent to about 25 percent of at least one alkaline earth metal oxide, from about 0 percent to about 15 percent of at least one alkali metal oxide, from about 0 percent to about 10 percent of titania, as much as about 1 percent of iron oxide, and from about 0 percent to about 3 percent of fluorine, which method includes the steps of charging batch constituents into a suitable melting tank to formulate a composition within the indicated proportions, and heating the batch constituents to effect vitrification thereof, while withdrawing streams of the vitreous material from the tank and forming fibers from such streams, the improvement comprising the steps of adding essentially all of the alkaline earth metal oxide to the batch as at least one alkaline earth metal compound selected from the group consisting of silicates and aluminates, and simultaneously increasing the rate of charging of the batch constituents and correspondingly increasing the rate of withdrawal of the streams of the vitreous material from the tank to rates at which foam within the melting tank prevents the withdrawal of the streams of the vitreous material therefrom when the alkaline earth metal oxide is charged in an uncombined form.

8. In a continuous method for producing borosilicate glass fibers containing at least one alkaline earth metal oxide and at least 2 precent of boric oxide, the combined content of alkaline earth metal oxide and boric oxide comprising at 4 percent of the glass composition, balance silica and other glass-forming ingredients, which methods includes the steps of charging batch constituents into a suitable melting tank, and heating the batch constituents to effect vitrification thereof, while withdrawing streams of the vitreous material from the tank and forming fibers from such streams, the improvement comprising the steps of adding wollanstanite to the batch in an amount sufficient to supply at least substantially one-half of the alkaline earth metal oxide content of the vitreous material, and simultaneously increasing the rate of charging of the batch constituents and correspondingly increasing the rate of withdrawal of the streams of the vitreous material from the tank to rates at which foam within the melting tank prevents the withdrawal of the streams of the vitreous material therefrom when the alkaline earth metal oxide is charged in an uncombined form.

9. A continuous method for producing borosilicate glass fibers containing at least one alkaline earth metal oxide and at least 2 percent of boric oxide, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding all of the boric oxide to the batch as calcium borate wherein the molar ratio of boron oxide to calcium oxide is not greater than 2.55:1, but comprising sufficient boric oxide to supply the proportion thereof required without also supplying an excess of calcium oxide, and simultaneously increasing the rate of charging of the batch constituents and correspondingly increasing the rate of withdrawal of the streams of the vitreous material from the tank to rates at which foam within the melting tank prevents the withdrawal of the streams of the vitreous material therefrom when the boric oxide is charged in an uncombined form.

10. A continuous method for producing borosilicate glass fibers containing at least one alkaline earth metal oxide at least 2 percent of boric oxide, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding all of the boric oxide to the batch as a magnesium borate wherein the molar ratio of boron oxide to magnesium oxide is not greater than 0.95:1, but comprising sufficient boric oxide to supply the proportion thereof required without also supplying an excess of calcium oxide, and simultaneously increasing the rate of charging of the batch constituents and corrsepondingly increasing the rate of withdrawal of the streams of the vitreous material from the tank to rate at which foam within the melting tank prevents the withdrawal of the streams of the vitreous material therefrom when the boric oxide is charged in an uncombined form.

11. A continuous method for producing borosilicate glass fibers containing at least one alkaline earth metal oxide and at least 2 percent of boric oxide, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding all of the boric acid to the batch as a barium borate wherein the molar ratio of boron oxide to barium oxide is not greater than 5.1:1, but comprising sufficient boric oxide to supply the proportion thereof required without also supplying an excess of calcium oxide, and simultaneously increasing the rate of charging of the batch constituents and correspondingly increasing the rate of withdrawal of the streams of the vitreous material from the tank to rates at which foam within the melting tank prevents the withdrawal of the streams of the vitreous material therefrom when the boric oxide is charged into an uncombined form.

12. In a continuous method for producing borosilicate glass fibers containing at least one alkaline earth metal oxide and at least 2 percent of boric oxide, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding all of the boric oxide to the batch as at least one metal borate comprising an amount of boric oxide such that the borate forms a single liquid phase upon fusion, but introduces not more than the required proportion of any constituent of the borosilicate glass, and simultaneously increasing the rate of charging of the batch constituents and correspondingly increasing the rate of withdrawal of the streams of the vitreous material from the tank to rates at which foam within the melting tank prevents the withdrawal of the streams of the vitreous material therefrom when the boric oxide is charged in an uncombined form.

13. In a continuous method for producing borosilicate glass fibers containing at least one alkaline earth metal oxide, at least 2 percent of boric oxide, and not more than about 0.4 percent of sodium sulfate, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding at least one alkaline earth metal compound selected from the group consisting of aluminates and silicates to the batch in an amount sufficient to supply at least one-half of the alkaline earth metal oxide content of the vitreous material, and simultaneously increasing the rate of charging of the batch constituents and correspondingly increasing the rate of withdrawal of the streams of the vitreous material from the tank to rates at which foam within the melting tank prevents the withdrawal of the streams of the vitreous material therefrom when the alkaline earth metal oxide is charged in an uncombined form.

14. In a continuous glass melting process for producing a borosilicate glass containing from about 50 percent to about 75 percent of silica, from about 2 percent to about 15 percent of $B_2O_3$, from about 2 percent to about 25 percent of at least one alkaline earth metal oxide, not more than 15 percent of $Na_2O$ and $K_2O$, from 2 to 20 percent of $Al_2O_3$, not more than 10 percent of $TiO_2$, not more than 1 percent of $Fe_2O_3$, and not more than about 3 percent of $F_2$, the combined content of alkaline earth metal oxide and boric oxide comprising at least 4 percent of the glass composition, which method includes the steps of charging batch constituents into a suitable melting tank and heating the batch constituents to effect vitrification thereof, while withdrawing vitreous material from the tank, the improvement of adding all of the boric oxide to the batch as an alkaline earth metal borate comprising an amount of boric oxide sufficiently low that such borate forms a single liquid phase upon fusion, but sufficient boric oxide to supply the proportion thereof required without also supplying an excess of an alkaline earth metal oxide.

15. In a continuous glass melting process for producing a borosilicate glass containing from about 50 percent to about 75 percent of silica, from about 2 percent to about 15 percent of $B_2O_3$, from about 2 percent to about 25 percent of at least one alkaline earth metal oxide, not more than 15 percent of $Na_2O$ and $K_2O$, from 2 to 20 percent of $Al_2O_3$, not more than 10 percent of $TiO_2$, not more than 1 percent of $Fe_2O_3$, and not more than about 3 percent of $F_2$, the combined content of alkaline earth metal oxide and boric oxide comprising at least 4 percent of the glass composition, which method includes the steps of charging batch constituents into a suitable melting tank and heating the batch constituents to effect vitrification thereof, while withdrawing vitreous material from the tank, the improvement of adding all of the boric oxide to the batch as a calcium borate wherein the mol ratio of boric oxide to calcium oxide is not greater than 2.55:1, but comprising sufficient boric oxide to supply the proportion thereof required without also supplying an excess of calcium oxide.

16. In a continuous glass melting process for producing a borosilicate glass containing from about 50 percent to about 75 percent of silica, from about 2 percent to about 15 percent of $B_2O_3$, from about 2 percent to about 25 percent of at least one alkaline earth metal oxide, not more than 15 percent of $Na_2O$ and $K_2O$, from 2 to 20 percent of $Al_2O_3$, not more than 10 percent of $TiO_2$, not more than 1 percent of $Fe_2O_3$, and not more than about 3 percent of $F_2$, the combined content of alkaline earth metal oxide and boric oxide comprising at least 4 percent of the glass composition, which method includes the steps of charging batch constituents into a suitable melting tank and heating the batch constituents to effect vitrification thereof, while withdrawing vitreous material from the tank, the improvement of adding all of the boric oxide to the batch as a magnesium borate wherein the mol ratio of boric oxide to magnesium oxide is not greater than 0.95:1, but comprising sufficient boric oxide to supply the proportion thereof required without also supplying an excess of magnesium oxide.

17. In a continuous glass melting process for producing a borosilicate glass containing from about 50 percent to about 75 percent of silica, from about 2 percent to about 15 percent of $B_2O_3$, from about 2 percent to about 25 percent of at least one alkaline earth metal oxide, not more than 15 percent of $Na_2O$ and $K_2O$, from 2 to 20 percent of $Al_2O_3$, not more than 10 percent of $TiO_2$, not more than 1 percent of $Fe_2O_3$, and not more than about 3 percent of $F_2$, the combined content of alkaline earth metal oxide and boric oxide comprising at least 4 percent of the glass composition, which method includes the steps of charging batch constituents into a suitable melting tank and heating the batch constituents to effect vitrification thereof, while withdrawing vitreous material from the tank, the improvement of adding all of the boric oxide to the batch as a barium borate wherein the mol ratio of boric oxide to barium oxide is not greater than 5.13:1, but comprising sufficient boric oxide to supply the proportion thereof required without also supplying an excess of barium oxide.

18. In a continuous glass melting process for producing a borosilicate glass containing from 50 percent to about 75 percent of silica, from about 2 percent to about 15 percent of $B_2O_3$, from about 2 percent to about 25 percent of at least one alkaline earth metal oxide, not more than 15 percent of $Na_2O$ and $K_2O$, from 2 to 20 percent of $Al_2O_3$, not more than 10 percent of $TiO_2$, not more than 1 percent of $Fe_2O_3$, and not more than about 3 percent of $F_2$, the combined content of alkaline earth metal oxide and boric oxide comprising at least 4 percent of the glass composition which method includes the steps of charging batch constituents into a suitable melting tank and heating the batch constituents to effect vitrification thereof, while withdrawing vitreous material from the tank, the improvement of adding all of the boric oxide to the batch as at least one alkaline earth metal borate comprising an amount of boric oxide such that the borate forms a single liquid phase upon fusion, but introduces not more than the required proportion of an alkaline earth metal oxide.

19. In a continuous method for producing borosilicate glass fibers consisting essentially of from about 50 percent to about 75 percent of silica, from about 2 percent to about 15 percent of boric oxide, from about 2 percent to about 25 percent of at least one alkaline earth metal oxide, from about 0 percent to about 15 percent of at least one alkali metal oxide, from about 0 percent to about 10 percent of titania, as much as about 1 percent of iron oxide, and from about 0 percent to about 3 percent of fluorine, which method includes the steps of charging batch constituents into a suitable melting tank to formulate a composition within the indicated proportions, and heating the batch constituents to effect vitrification thereof, while withdrawing streams of the vitreous material from the tank and forming fibers from such streams, the improvement comprising the steps of adding essentially all of the alkaline earth metal oxide to the batch as at least one alkaline earth metal compound selected from the group consisting of silicates and aluminates.

20. In a continuous method for producing borosilicate glass fibers containing at least one alkaline earth metal oxide, at least 2 percent of boric oxide, and not more than about 0.4 percent of sodium sulfate, the combined content of alkaline earth metal oxide and boric oxide comprising at least 4 percent of the glass composition, balance silica and other glass-forming ingredients, which method includes the steps of charging batch constituents into a suitable melting tank, and heating the batch constituents to effect vitrification thereof, while withdrawing streams of the vitreous material from the tank and forming fibers from such streams, the improvement comprising the steps of adding at least one alkaline earth metal compound selected from the group consisting of aluminates and silicates to the batch in an amount sufficient to supply at least one-half of the alkaline earth metal oxide content of the vitreous material.

References Cited by the Examiner

UNITED STATES PATENTS

| | | | |
|---|---|---|---|
| 1,091,678 | 3/1914 | Locke | 106—54 |
| 2,051,279 | 8/1936 | Thorndyke | 106—50 |
| 2,155,721 | 4/1939 | Lee | 106—54 |
| 2,681,289 | 6/1954 | Moore | 106—54 |

FOREIGN PATENTS

| | | |
|---|---|---|
| 239,349 | 9/1925 | Great Britain. |
| 393,907 | 6/1953 | Great Britain. |

TOBIAS E. LEVOW, *Primary Examiner.*

JOSEPH REBOLD, JOHN R. SPECK, *Examiners.*

D. ARNOLD, H. McCARTHY, *Assistant Examiners.*